UNITED STATES PATENT OFFICE.

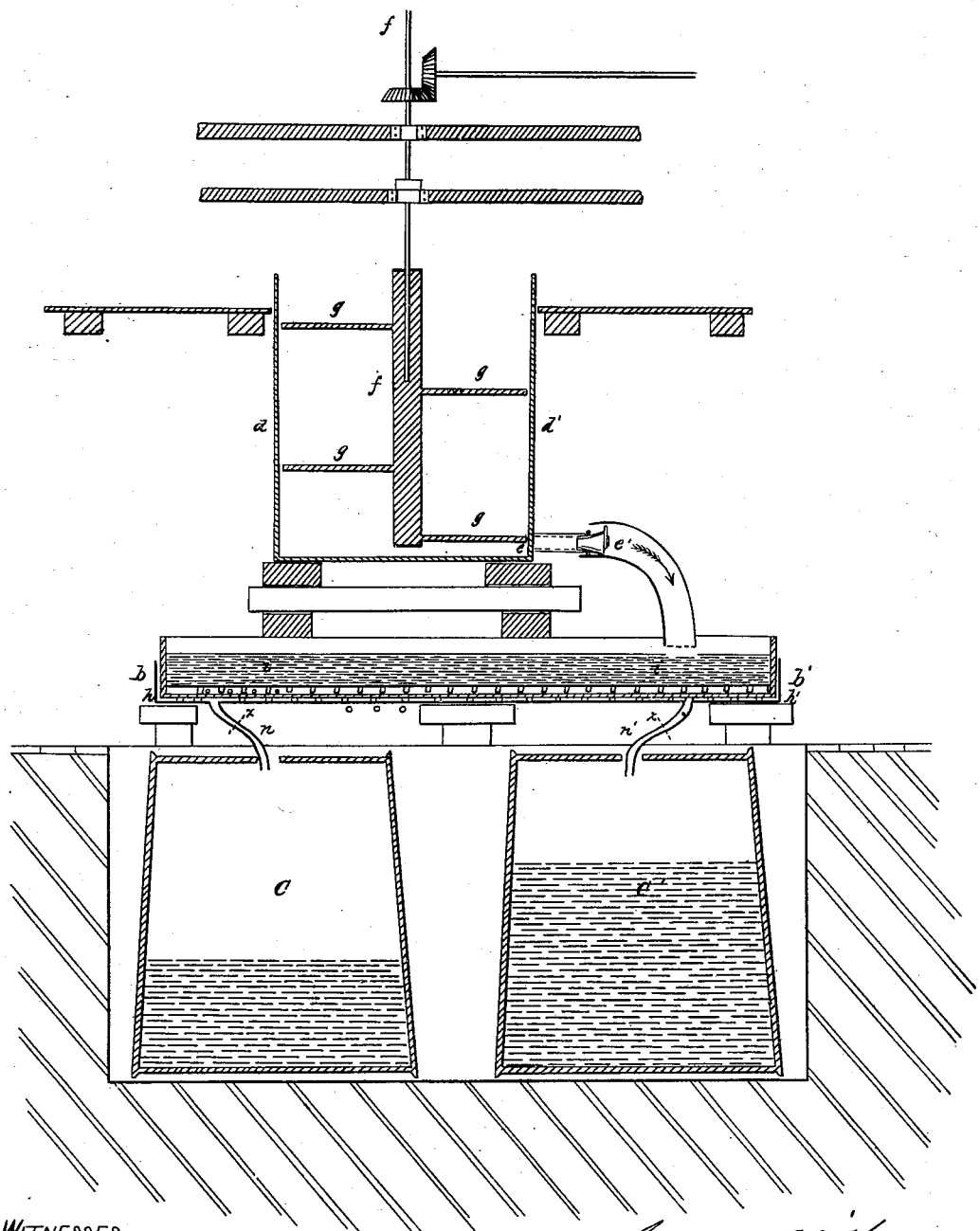

GEORGE F. WILSON, OF EAST PROVIDENCE, RHODE ISLAND, AND E. N. HORSFORD, OF CAMBRIDGE, MASSACHUSETTS.

IMPROVEMENT IN THE MANUFACTURE OF PHOSPHATES AND IN EXTRACTING PHOSPHORIC ACID FROM BONES.

Specification forming part of Letters Patent No. 75,336, dated March 10, 1868.

*To all whom it may concern:*

Be it known that we, GEORGE F. WILSON, of East Providence, in the county of Providence and State of Rhode Island, and EBEN NORTON HORSFORD, of the city of Cambridge, in the county of Middlesex and State of Massachusetts, have invented a new and Improved Method of Extracting Acid Phosphate of Lime from Burned Bone; and we do hereby declare that the following is a full and exact description thereof, reference being had to the accompanying drawing, and to the letters of reference thereon.

To obtain the acid phosphate of lime from bone burned gray in accordance with the specification of Geo. F. Wilson in his application for a patent of even date herewith, two processes are necessary: first, the decomposition of the burned bone by means of sulphuric acid, called "dredging;" and, second, the leaching of the soluble acid phosphate of lime from the relatively insoluble sulphate of lime and carbon. The former process requires prolonged agitation of the burned bone with diluted sulphuric acid, diluted to the point which throws down the sulphate of lead in the oil of vitriol. The dredging or agitating machine used for this purpose is a wooden tub lined with lead, or it may be wholly of lead, in which, reaching nearly to the bottom, is an upright shaft of wood, having arms, also of wood, at right angles to the shaft, extending nearly to the lateral walls of the tub. This shaft is supported by a collar above, independent of the tub, and revolved by power, by which the agitation of the mixed burned bone and diluted sulphuric acid in the tub is continued as long as may be necessary. At the bottom of the tub, on one side, is a pipe closed by a plug, through which, when the decomposition of the bones is completed, the contents of the dredging or agitating machine are drawn off into the leach.

Various devices for the separation of the acid phosphate of lime from the sulphate of lime and carbon have been successively tested by us and abandoned.

The product of the dredging was at first placed in an upright trunk or long cask having straw at the bottom, which bottom was pierced with holes. Upon the top, from time to time, water was poured as it ran through carrying with it the soluble acid phosphate; but it was found that the unequal texture of the mass of decomposed bone permitted the water to pass through some parts more freely than through others, so that while some portions were thoroughly exhausted others were very imperfectly leached. The cask or trunk, in our next attempt, was closed at the top and the pressure of a column of water brought to bear on the mass to be leached. The leaching was still imperfect.

In the next attempt steam was introduced through the cover and the pressure of steam brought to bear on the condensed hot water. This method had some advantages, but the difficulty of keeping the wooden cask steam-tight made it desirable to construct the cask of iron with a head attached by flanges and bolts. This iron cask was lined with lead, was broad at the top and narrow at the bottom, was supported on trunnions, and permitted the introduction of steam of any desired pressure. The bottom was perforated with numerous holes for the escape of the acid liquor. This apparatus was objectionable on account of the rapid corrosion of the lead lining and the expense of the steam, as well as on account of the difficulty of working large quantities with inclosed spaces so small as these must necessarily be to be handled easily. Pebbles drenched with muriatic acid and afterward with water to remove all traces of soluble iron, salts, or oxides, were mixed with the mass to be leached, to prevent unequal lixiviation; but the experiment failed to accomplish the desired end.

After much experimenting we invented a new and improved leach, consisting of a broad shallow pan, in which the tendency to run ways in the mass to be leached could be arrested by tamping or trampling over the whole surface and producing or restoring uniform density and thickness of the mass to be leached.

The apparatus consists of a lead pan, within which and resting on strips of wood is a leaching-frame the sides of which are made of wood and the bottom made of a single broad sheet of woolen felt, supported by and resting on a grating of wooden bars, which bars rest upon a perforated floor of wood, which wooden floor rests upon little blocks placed on the bottom of the lead pan, the whole being so arranged that liquid passing through the leach will readily find way to the bottom of the lead pan, and is conducted thence by lead pipes from the lead pan to the reservoirs for the reception of the acid liquor.

The accompanying diagram shows, in section, the arrangement of the various parts.

A A' is the dredging-tub, with its stirrer-shaft $f$ and the arms $g$ $g$ $g$ $g$, its tube and plug $e$ $e'$ secured in place, the leach $b$ $b'$, with its leaden pan $h$ $h'$, its mass of pulp to be leached, $i$ $i$, resting on the felt bottom, supported by grating of wood resting on the perforated floor, which in turn rests on the wooden bars $o$ $o$ $o$, &c., lying on the bottom of the leaden pan. $n$ $n'$ are leaden tubes conducting from the pan and leach to the liquor-tanks C C'.

The practical use of the apparatus is as follows: The plug $r$ $r'$ having been driven to its seat, the dredging-tub A A' is about two-thirds filled with weak acid phosphate of lime and water. To this, the stirrer having been set in motion, is added a charge of oil of vitriol, from which, by mixing with the large volume of water, the sulphate of lead is precipitated. The bone, burned gray and prepared according to the specification of the application for a patent by George F. Wilson, of even date herewith, is then added slowly while the stirrer is constantly in motion until the whole amount to be treated at one time has been put in. The agitation is then continued for about eighteen hours, till the decomposition of the bone is complete. The plug is then withdrawn and the products of the dredging process—that is, the skeleton grains of bones burned gray, treated throughout with sulphuric acid—pass to the leach and are received on the felt and evenly distributed over it. This arrangement of the apparatus permits the solution of acid phosphate of lime to pass through the mass that has been treated and through the felt, while the organic structure of the bone is still preserved, carbon being still retained therein, as well as a portion of acid phosphate of lime, which it is desirable to disengage from the structure and carry through the leach. The body of the pulp as it lies upon the felt may be unequally dense, and, if so, water thrown upon it would pass through some parts with greater facility than through others, thus failing to leach the mass, while at the same time it dilutes the acid already obtained. To prevent this, and to render the whole mass of the leach substantially homogeneous, the entire surface is tamped or trampled over. Water is then, from time to time, poured over the mass, and by displacement drives down and out through the felt bottom the solution of acid phosphate. The alternate tamping and affusion of water are repeated until for practical purposes the water that filters through will not pay to evaporate.

By this improved process and apparatus applied to bone that has been previously prepared for it we have succeeded in leaching out all the acid phosphate of lime contained therein on a scale adapted to manufacturing purposes.

The lead pipes for conducting the liquor from the leach to the liquor-tanks may discharge at a few feet or inches from their exit, or by means or rubber or gutta-percha hose may be prolonged to any convenient distance before discharging.

The two tanks C C' may be used together indifferently, or by stop-cocks in $n$ $n'$ the stronger acid may be run into one tank C, and its stopcock being closed and the other open, the remaining weaker acid will run into the tank C'. The same ends may be gained by the use of flexible extension hose.

What we claim, and desire to secure by Letters Patent of the United States, is—

1. The new and improved process of extracting acid phosphate of lime from bones, as hereinabove stated.

2. The continuous agitation of the mixture of sulphuric acid, acid phosphate of lime, and pulverized gray bones, by which the action of the sulphuric acid is rendered uniform and the sulphate of lime produced in the decomposition of the gray bone is prevented from setting or hardening in lumps or in mass, which would interfere with leaching as well as with the perfect decomposition of the gray bones.

3. The distribution of the mass to be leached in broad shallow pans, in the manner and for the purpose above described.

4. The use of vessels made of lead or lined with lead, for the purpose above described.

5. The application of the tamping operation or its equivalent to the mixed acid phosphate of lime, carbon, and sulphate of lime, to keep them as nearly as possible of uniform thickness and consistency upon the leach-cloth, in order to the more uniform and perfect leaching thereof.

6. The treatment of the burned bones above described with sulphuric acid diluted to or beyond the point of precipitating the sulphate of lead present therein, this dilution being made with a weak solution of acid phosphate of lime.

7. The apparatus above and substantially as described, as a whole, for the purpose of obtaining liquid acid phosphate of lime, substantially as above described.

GEO. F. WILSON.
E. N. HORSFORD.

Witnesses:
WILLIAM HEDGE,
W. H. McGRENERY.